United States Patent
Bagheri et al.

(10) Patent No.: US 11,844,090 B2
(45) Date of Patent: *Dec. 12, 2023

(54) APPARATUS AND METHOD FOR COMMUNICATING A DATA COMMUNICATION WITH AN OFFSET

(71) Applicant: Lenovo (Singapore) Pte. Ltd., New Tech Park (SG)

(72) Inventors: Hossein Bagheri, Urbana, IL (US); Vijay Nangia, Woodridge, IL (US); Hyejung Jung, Northbrook, IL (US); Robert T. Love, Barrington, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 26 days.

This patent is subject to a terminal disclaimer.

(21) Appl. No.: 17/693,252

(22) Filed: Mar. 11, 2022

(65) Prior Publication Data

US 2022/0201738 A1    Jun. 23, 2022

Related U.S. Application Data

(63) Continuation of application No. 16/865,415, filed on May 3, 2020, now Pat. No. 11,304,224.

(Continued)

(51) Int. Cl.
*H04W 72/23* (2023.01)
*H04W 52/02* (2009.01)
*H04W 72/21* (2023.01)

(52) U.S. Cl.
CPC ....... *H04W 72/23* (2023.01); *H04W 52/0216* (2013.01); *H04W 72/21* (2023.01)

(58) Field of Classification Search
CPC .. H04W 52/0216; H04W 72/21; H04W 72/23

(Continued)

(56) References Cited

U.S. PATENT DOCUMENTS

| 11,304,224 B2 * | 4/2022 | Bagheri | H04W 52/0229 |
| 2020/0236692 A1 | 7/2020 | Lin et al. | |
| 2020/0314816 A1 | 10/2020 | Yi et al. | |

FOREIGN PATENT DOCUMENTS

WO   WO-2020206164 A1 *  10/2020   ......... H04L 41/0803

OTHER PUBLICATIONS

Vinncelas, Notice of References Cited, PTO-892, U.S. Appl. No. 17/718,266 U.S. Patent and Trademark Office, Feb. 15, 2023.

* cited by examiner

*Primary Examiner* — Peter G Solinsky
(74) *Attorney, Agent, or Firm* — Loppnow & Chapa; Matthew C. Loppnow

(57) ABSTRACT

A minimum scheduling offset value (Kmin value) between scheduling DCI and a corresponding data communication can be determined based on an indication from a network and a channel processing capability. Particular scheduling DCI scheduling a particular corresponding data communication can be received. A determination can be made regarding whether the determined Kmin value is applicable to the particular scheduling DCI and the particular corresponding data communication. In response to determining the determined Kmin value is applicable to the particular scheduling DCI and the particular corresponding data communication, the particular corresponding data communication can be communicated with the network such that the offset between the particular scheduling DCI and the particular corresponding data communication is at least the determined Kmin value.

20 Claims, 6 Drawing Sheets

Related U.S. Application Data

(60) Provisional application No. 62/842,474, filed on May 2, 2019.

(58) Field of Classification Search
USPC .......................................................... 370/329
See application file for complete search history.

APPARATUS AND METHOD FOR COMMUNICATING A DATA COMMUNICATION WITH AN OFFSET

BACKGROUND

1. Field

The present disclosure is directed to an apparatus and method for communicating a data communication with an offset. More particularly, the present disclosure is directed to communicating a data communication with an offset from scheduling downlink control information on a wireless wide area network.

2. Introduction

Presently, wireless communication devices, such as User Equipment (UE), communicate with other communication devices using wireless signals. When a UE is not expected to receive or transmit over a time duration, it can go into a micro-sleep mode, where the UE can save power by going into a low power state, such as in Radio-Frequency (RF) components, in its front-end, in other modem hardware, and/or in other components. The UE can extend the micro-sleep duration if the UE knows that the Physical Downlink Shared Channel (PDSCH) corresponding to a Physical Downlink Control Channel (PDCCH), the PDCCH containing scheduling Downlink Control Information (DCI), will not start before finishing decoding of the PDCCH via avoiding unnecessary buffering of Orthogonal Frequency Division Multiplexing (OFDM) symbols, such as for potential PDSCH, after the PDCCH is received but before the PDCCH is decoded. For example, micro-sleep duration can be extended if the PDSCH corresponding to the PDCCH, the PDCCH containing scheduling DCI, in slot 'n', will occur in slot 'n+k0', which is referred to as cross-slot scheduling, where k0>0 for all k0 values in the associated Time-Domain Resource Allocation (TDRA) table, such as Table 5.1.2.1.1-2 in Technical Specification TS 38.214. The minimum K0 value can be decided by the network based on some UE feedback/assistance, such as UE capability signaling, as power saving is highly related to UE implementation, and may be different for different Subcarrier Spacings (SCS).

Once the UE goes into the power saving mode, such as extended micro-sleep which may occur in case of a traffic burst, it is desired to avoid scheduling delays, such as via switching from cross-slot scheduling back to same-slot scheduling, where scheduling DCI and the corresponding scheduled PDSCH are in the same slot. One way to realize dynamic switching between power saving mode and non-power saving mode, such as cross-slot scheduling versus same-slot scheduling, is to indicate min K0 explicitly or implicitly in scheduling DCI, via indicating a subset of TDRA table entries or indicating different TDRA tables from a set of configured TDRA table.

A deployment scenario where multiple Transmission/Reception Points (TRPs) can transmit/receive data to/from a UE could lead to better communication, such as multi-TRP provides diversity, and hence more reliable communication. Depending on backhaul delay/latency with respect to joint dynamic scheduling, two general scenarios of multi-TRP with ideal backhaul, such as joint scheduling possible as backhaul delay is small, and multi-TRP with non-ideal backhaul exist, such as joint scheduling is not possible because of large backhaul delay. For non-ideal backhaul, each TRP/panel transmission can be scheduled via a separate PDCCH, and multiple TRPs may only have semi-static coordination and distributed scheduling. For ideal backhaul, all or a set of multi-TRP/panel transmissions can be scheduled via a single DCI/PDCCH.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide an apparatus and method for communicating a data communication with an offset with respect to a scheduling command scheduling the data communication for power saving. At least some embodiments can provide power saving for multi-TRP operation. According to a possible embodiment, a minimum scheduling offset value between scheduling DCI and a corresponding data communication can be determined based on a control channel configuration. Particular scheduling DCI scheduling a particular corresponding data communication can be received. A determination can be made regarding whether the determined Kmin value is applicable to the particular scheduling DCI and the particular corresponding data communication. The particular corresponding data communication can be communicated with a network such that the offset between the particular scheduling DCI and the particular corresponding data communication is at least the determined Kmin value.

According to a possible embodiment, a first indication can be received from at least one first Transmission Reception Point (TRP) of a first set of TRPs of a network. The first indication can indicate a minimum scheduling offset value (Kmin value) between scheduling DCI of the first set of TRPs and a corresponding data communication. A second indication can be indicated to at least one second TRP of a second set of TRPs of the network. The second indication can indicate the Kmin value. A first scheduling DCI can be received scheduling a first corresponding data communication associated with the first set of TRPs. A second scheduling DCI can be received scheduling a second corresponding data communication associated with the second set of TRPs. The first corresponding data communication can be communicated with the first set of TRPs of the network such that the offset between the first scheduling DCI and the first corresponding data communication is at least the Kmin value. The second corresponding data communication can be communicated with the second set of TRPs of the network such that the offset between the second scheduling DCI and the second corresponding data communication is at least the Kmin value.

Figure 1:
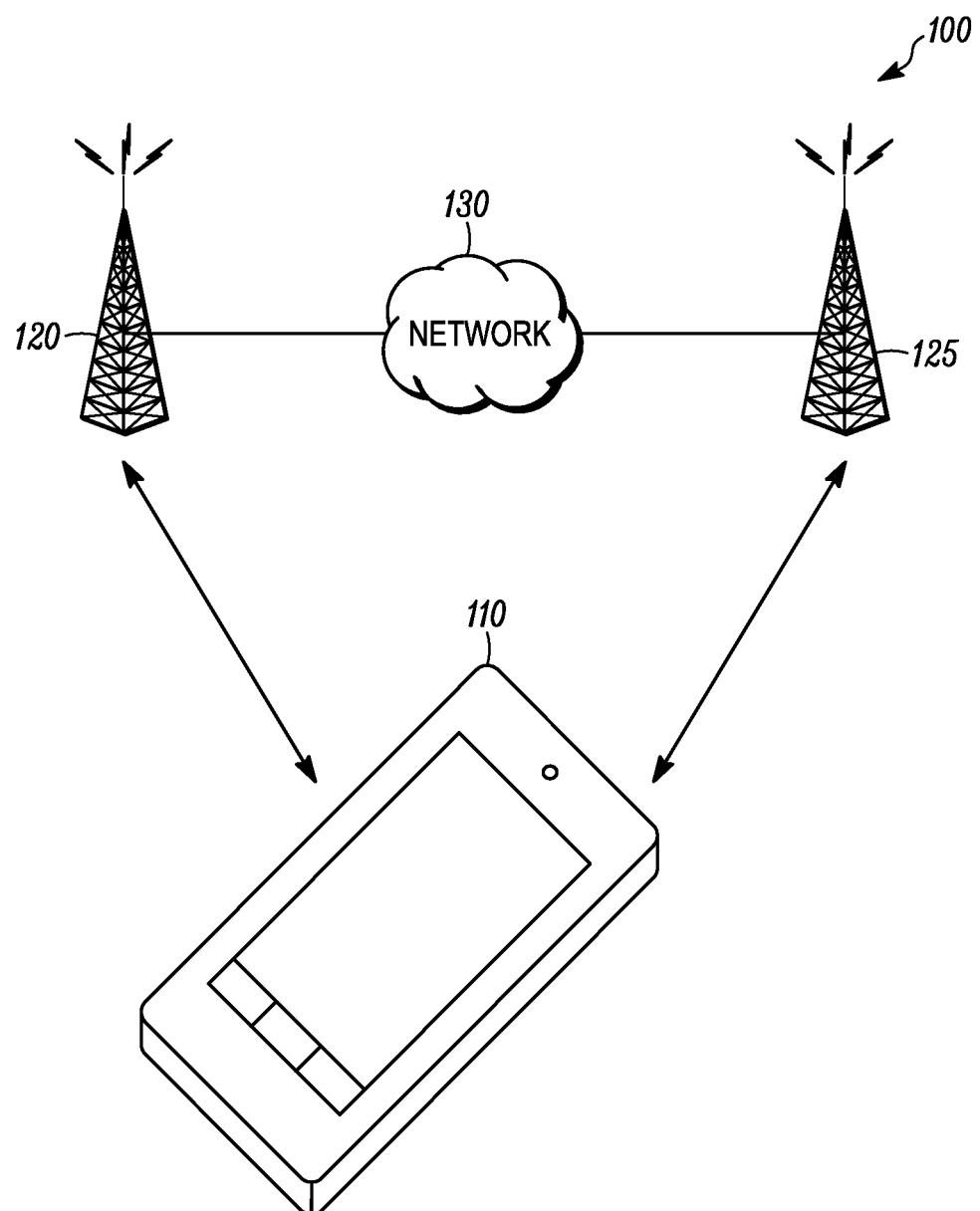
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an Internet of Things (IoT) device, or any other user device that is capable of sending and receiving communication signals on a wireless network. The at least one network entity 120 and 125 can be a wireless wide area network base station, can be a NodeB, can be an enhanced NodeB (eNB), can be a New Radio (NR) NodeB (gNB), such as a Fifth Generation (5G) NodeB, can be an unlicensed network base station, can be an access point, can be a base station controller, can be a network controller, can be a Transmission and Reception Point (TRP), can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a 5G network, a satellite communications network, a high altitude platform network, the Internet, and/or other communications networks.

In operation, the UE 110 can communicate with the network 130 via at least one network entity 120. For example, the UE 110 can send and receive control signals on a control channel and user data signals on a data channel.

At least some embodiments can provide methods to enable power saving via cross-slot scheduling in a multi-TRP setup. Since extended micro sleep can depend on the PDCCH decoding time, the UE feedback/assistance may need to take into account the number of TRPs. Multiple PDCCHs corresponding to multiple TRPs may need to be decoded in a slot, such as in case of non-ideal backhaul or ideal backhaul but with PDCCH repetition.

In some embodiments, different UE capabilities for a minimum K0 value can be signaled based on the number of TRPs, the UE can indicate to the other TRPs if UE configuration for one TRP results in the UE going into/out-of-power saving mode, and the minimum K0 value can be coordinated amongst TRP semi-statically.

Power saving can also be also applicable for other signals instead of PDSCH, such as similar arguments as above may be applicable for avoiding unnecessary buffering of aperiodic Channel State Information Reference Signal (CSI-RS), Physical Uplink Shared Channel (PUSCH) and Sounding Reference Signal (SRS), etc.

At least some embodiments can provide for power saving via cross-slot scheduling. In at least some embodiments, the cross-slot scheduling operation can be modified to enable power saving. Cross-slot scheduling can be possible via PDSCH time-domain resource allocation (TDRA) tables defined in TS 38.214, Tables 5.1.2.1.1-2-4. In particular, a TDRA table, which can contain e.g., up to 16 TDRA patterns per Bandwidth Part (BWP) can be configured by Radio Resource Control (RRC) signaling, and scheduling DCI indicates which entry of the TDRA table can be applicable to the scheduled PDSCH. Each entry of the TDRA table can include of three fields: K0, PDSCH mapping type, and StartSymbolAndLength. K0 can be the time gap between PDCCH and PDSCH in unit of slots. K0=0 can imply same-slot scheduling and K0>0 can imply cross-slot scheduling. Mapping type can refer to the mapping of the PDSCH. PDSCH-mapping-type-A can also be referred to as slot based. PDSCH-mapping-type-B can also be referred to as mini-slot based. startSymbolAndLength can indicate the starting symbol index and duration of PDSCH within a slot.

Figure 2:
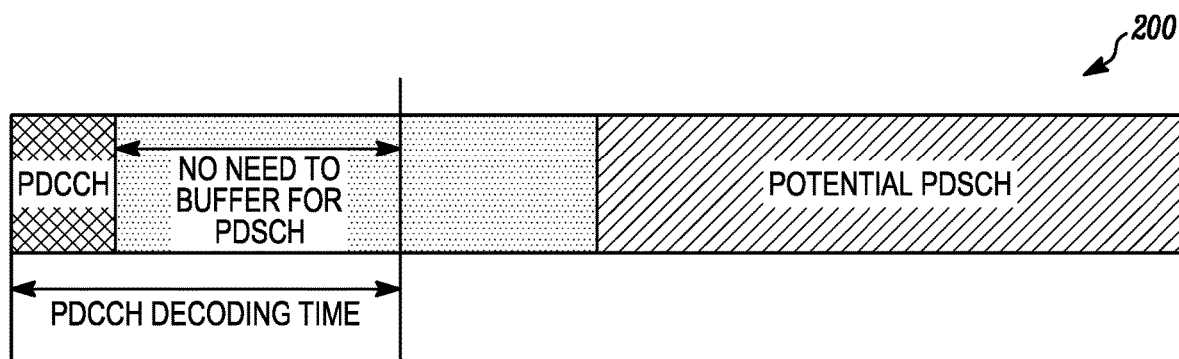
FIG. 2 is an example illustration a timeline where a PDCCH is received according to a possible embodiment.

FIG. 2 is an example illustration 200 a timeline where a PDCCH is received according to a possible embodiment. Cross-slot scheduling can be supported by configuring a TDRA table with the minimum K0>0. Then, the UE can avoid unnecessary PDSCH buffering while the PDCCH can be decoded leading to power saving. For example, if UE knows K0>0 before PDCCH decoding, there can be no need to perform unnecessary PDSCH buffering while the PDCCH being decoded.

From a latency perspective, same-slot scheduling, or in general having no gap or small gap between PDCCH and PDSCH can be used. In case of a Downlink (DL) traffic burst, it can be useful to switch back to same-slot scheduling from cross-slot scheduling. To avoid delay due to RRC reconfiguration signaling such as between cross-slot and same-slot scheduling, dynamic signaling can be used to determine a minimum K0 value.

In some embodiments for an active DL and an active UL BWP, a UE can be indicated via signaling from a gNB to adapt the minimum applicable value(s) of K0, K2 and/or aperiodic CSI-RS triggering offset with/without QCL_typeD configured where the signaling type can be down-selected from at least Medium Access Control (MAC) Control Element (CE) based and Layer 1 (L1) based signaling types.

In some embodiments, indication methods to adapt the minimum applicable value of K0 or K2 for an active DL or UL BWP, can include an indication of a subset of TDRA entries, such as a bit-map based indication. Another indication method can include an indication of one active table from multiple configured TDRA tables. Another indication method can include an indication of the minimum applicable value. In some embodiments PDCCH monitoring case 1-1 can be prioritized.

In at least some embodiments, adapting the minimum applicable value of the aperiodic CSI-RS triggering offset for an active DL BWP, can be indicated by an implicit indication by defining the minimum applicable value the same as the minimum applicable K0 value when indicated. In some embodiments adapting the minimum applicable value of the aperiodic CSI-RS triggering offset for an active DL BWP can be an indication of the minimum applicable value. In some embodiments the PDCCH monitoring case 1-1 can be prioritized for the design.

In at least some embodiments, the adaptation on the minimum applicable value of K0 may not apply to at least some of the cases in Table 1, where RNTI is Radio Network Temporary Identifier, SI is System Information, RA is Random Access, TC is Temporary Cell, and P is Paging.

TABLE 1

| RNTI | PDCCH search space |
| --- | --- |
| SI-RNTI | Type0 common |
| SI-RNTI | Type0A common |
| RA-RNTI, TC-RNTI | Type1 common |
| P-RNTI | Type2 common |

In at least some embodiments for aperiodic CSI-RS triggering, at least if a UE is operated with cross-slot scheduling based power saving if all of the associated trigger states do not have the higher layer parameter qcl-Type set to 'QCL-TypeD' in the corresponding Transmission Configuration Indication (TCI) states and the PDCCH SCS is equal to the CSI-RS SCS, then the aperiodic CSI-RS triggering offset can be set to a non-zero value.

In some embodiments when the UE is scheduled to receive PDSCH by a DCI, the Time domain resource assignment field value m of the DCI can provide a row index m+1 to an allocation table. The determination of the used resource allocation can be defined in sub-clause 5.1.2.1.1 of TS 38.214. The indexed row can define the slot offset K0, the start and length indicator SLIV, or directly the start symbol S and the allocation length L, and the PDSCH mapping type to be assumed in the PDSCH reception.

In some embodiments given the parameter values of the indexed row, the slot allocated for the PDSCH can be $$\left\lfloor n \cdot \frac{2^{\mu_{PDSCH}}}{2^{\mu_{PDCCH}}} \right\rfloor + K_0,$$

where n can be the slot with the scheduling DCI, and $K_0$ can be based on the numerology of PDSCH, and $\mu_{PDSCH}$ and $\mu_{PDCCH}$ can be the subcarrier spacing configurations for PDSCH and PDCCH, respectively. Also, the starting symbol S relative to the start of the slot, and the number of consecutive symbols L counting from the symbol S allocated for the PDSCH can be determined from the start and length indicator SLIV. For example,

```
if (L − 1) ≤ 7 then
    SLIV = 14 · (L − 1) + S
else
    SLIV = 14 · (14 − L + 1) + (14 − 1 − S)
    where 0 < L ≤ 14 − S.
```

Also, the PDSCH mapping type can be set to Type A or Type B as defined in sub-clause 7.4.1.1.2 of TS 38.211.

The UE can consider the valid S and L combinations defined in Table 2 as valid PDSCH allocations.

TABLE 2

| PDSCH mapping type | Normal cyclic prefix | | | Extended cyclic prefix | | |
| --- | --- | --- | --- | --- | --- | --- |
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Note 1:
S = 3 is applicable only if dmrs-TypeA-Position = 3

In at least some embodiments multi-TRP operation can enhance the communication reliability. Each TRP can be associated with a TCI state, and a single PDCCH, such as typically used for ideal/low-latency backhaul among TRPs, can be used to schedule PDSCH(s) associated with different TRPs. For non-ideal backhaul among TRPs different PDCCHs can schedule different PDSCHs corresponding to different TRPs. For ensuring high reliability of PDCCH, the same DCI can be signaled via different TRPs.

A UE can be higher-layer configured with a list of up to M TCI-State configurations to decode PDSCH intended for the UE in a serving cell, where M can depend on the UE capability. Each TCI-State can contain parameters for configuring a quasi-co-location relationship between one or two downlink reference signals and the Demodulation Reference Symbol (DM-RS) ports of the PDSCH. The quasi co-location relationship can be configured by the higher layer parameter qcl-Type1 for the first Downlink (DL) Reference Signal (RS), and qcl-Type2 for the second DL RS, if configured. For the case of two DL RSs, the Quasi Co-Location (QCL) types can be not the same, regardless of whether the references are to the same DL RS or different DL RSs. The quasi co-location types corresponding to each DL RS can be given by the higher layer parameter qcl-Type in QCL-Info and can take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In at least some embodiments a UE can be configured with the higher layer parameter tci-PresentInDCI that can be set as 'enabled' for the Control Resource Set (CORESET) scheduling the PDSCH, and the UE can assume that the TCI field is present in the DCI format 1_1 of the PDCCH transmitted on the CORESET. If tci-PresentInDCI is not configured for the CORESET scheduling the PDSCH or the PDSCH is scheduled by a DCI format 1_0, and the time offset between the reception of the DL DCI and the corresponding PDSCH is equal to or greater than a threshold Threshold-Sched-Offset, where the threshold can be based on reported UE capability, for determining PDSCH antenna port quasi co-location, then the UE can assume that the TCI state or the QCL assumption for the PDSCH can be identical to the TCI state or QCL assumption, whichever is applied for the CORESET used for the PDCCH transmission. If the tci-PresentInDCI is set as 'enabled', then the TCI field in DCI in the scheduling component carrier can point to the activated TCI states in the scheduled component carrier or DL BWP and when the PDSCH is scheduled by DCI format 1_1, the UE can use the TCI-State according to the value of the 'Transmission Configuration Indication' field in the detected PDCCH with DCI for determining PDSCH antenna port quasi co-location. The UE can assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold Threshold-Sched-Offset, where the threshold can be based on reported UE capability.

In at least some embodiments, candidate schemes for multi-TRP based Ultra Reliable Low Latency Communication (URLLC) can be scheduled by at least a single DCI where n ($n<=N_s$) TCI states can be within the single slot with overlapped time and frequency resource allocation, where each transmission occasion can be a layer or a set of layers of the same Transport Block (TB), with each layer or layer set can be associated with one TCI and one set of DMRS port(s), and single codeword with one Redundancy Version (RV) can be used across all spatial layers or layer sets. From the UE perspective, different coded bits can be mapped to different layers or layer sets with the same mapping rule as in Rel-15 of 3GPP. In at least some embodiments, each transmission occasion can be a layer or a set of layers of the same TB, with each layer or layer set can be associated with one TCI and one set of DMRS port(s), where a single codeword with one RV can be used for each spatial layer or layer set. The RVs corresponding to each spatial layer or layer set can be the same or different. In another embodiment one transmission occasion can be one layer of the same TB with one DMRS port associated with multiple TCI state indices, or one layer of the same TB with multiple DMRS ports associated with multiple TCI state indices one by one, and applying different MCS/modulation orders for different layers or layer sets can be selected.

In at least some embodiments, candidate schemes for multi-TRP based URLLC can be scheduled by at least a single DCI where n ($n<=N_s$) TCI states can be within the single slot with overlapped time and frequency resource allocation. Where n ($n<=N_f$) TCI states can be within the single slot, with non-overlapped frequency resource allocation, where each non-overlapped frequency resource allocation can be associated with one TCI state, same single/multiple DMRS port(s) can be associated with all non-overlapped frequency resource allocations. In another embodiment single codeword with one RV can be used across full resource allocation. From a UE perspective, the common RB mapping, such as codeword to layer mapping as in Rel-15, can be applied across full resource allocation. In other embodiments a single codeword with one RV can be used for each non-overlapped frequency resource allocation, the RVs corresponding to each non-overlapped frequency resource allocation can be the same or different. Applying different MCS/modulation orders for different non-overlapped frequency resource allocations can be selected, and a frequency resource allocation mechanism for FDM 2a/2b with regarding to allocation granularity, time domain allocation can be determined.

In at least some embodiments, candidate schemes for multi-TRP based URLLC can be scheduled by at least a single DCI where n ($n<=N_s$) TCI states can be within the single slot with overlapped time and frequency resource allocation, where n ($n<=N_{t1}$) TCI states within the single slot, with non-overlapped time resource allocation, and each transmission occasion of the TB can have one TCI and one RV with the time granularity of mini-slot. All transmission occasion(s) within the slot can use a common Modulation and Coding Scheme (MCS) with the same single or multiple DMRS port(s), and RV/TCI state can be the same or different among transmission occasions. Channel estimation interpolation can be performed across mini-slots with the same TCI index.

In at least some embodiments for TDM, where n ($n<=N_{t2}$) TCI states with K ($n<=K$) different slots, each transmission occasion of the TB can have one TCI and one RV, all transmission occasion(s) across K slots can use a common MCS with same single or multiple DMRS port(s), RV/TCI state can be same or different among transmission occasions, and channel estimation interpolation can be performed across slots with the same TCI index.

In at least some embodiments, M-TRP/panel based URLLC schemes can be compared in terms of improved reliability, efficiency, and specification impact, and support of number of layers per TRP can be discussed.

In some embodiments, to support multiple-PDCCH based multi-TRP/panel transmission with intra-cell with the same cell ID, and inter-cell with different Cell IDs, a RRC configuration can be used to link multiple PDCCH/PDSCH pairs with multiple TRPs where one CORESET in a "PDCCH-config" can correspond to one TRP.

In one embodiment, the UE can indicate a first and a second capability for minimum value of a scheduling offset, such as a time gap between the end of the scheduling PDCCH and the beginning of the corresponding PDSCH, referred to as K0_min, to the network. The first capability can be associated with single-TRP operation and the second capability can be associated with multi-TRP operation.

The following embodiments can be dependent or independent embodiments with respect to each other. The first K0_min which can correspond to the first capability signal can be smaller than the second K0_min corresponding to the second capability signaling. The UE can indicate via scheduling PDCCH an entry of a TDRA table. In some embodiments, if the corresponding K0 is smaller than the applicable K0_min then the UE may not expect to be scheduled with that TDRA entry. In one embodiment, the UE can be expected to not receive PDSCH corresponding to the scheduling PDCCH indicating that TDRA entry. In another embodiment, for PUSCH instead of PDSCH, K2_min can be used instead of K0_min, and if the UE is indicated via scheduling PDCCH an entry of an UL TDRA table, if the corresponding K2 is smaller than the applicable K2_min, then the UE may not expect to be scheduled with that TDRA entry. In an alternate embodiment, if high priority data comes in the UL buffer and is indicated by a Buffer Status Report (BSR), then the UE, upon reception of PDCCH indicating an Uplink (UL) TDRA table entry with corresponding K2 being smaller than the applicable K2_min, can follow the indicated UL TDRA, where the DCI indication of K2 smaller than K2_min can be allowed.

In at least some embodiments, K0_min can be determined based on the UE capability signaling. In case different K0_min UE capabilities for different scenarios are indicated, the UE can determine the applicable K0_min based on the scenario for which K0_min UE capability is defined. If the UE is configured to monitor a first number of maximum CORESETs per "PDCCH-config", referred to as 'm1,' such as 3, then the UE can determine the applicable K0_min based on the first K0_min. If the UE is configured to monitor a second number of maximum CORESETs per "PDCCH-config", referred to as 'm2', such as 5, then the UE can determine the applicable K0_min based on the second K0_min, where m1<m2. If the maximal number of BD/CCE per slot per serving cell for the UE is 'W1', then the UE can determine the applicable K0_min based on the first K0_min. If the maximal number of BD/CCE per slot per serving cell for the UE is 'W2', then the UE can determine the applicable K0_min based on the second K0_min, where W1<W2. If the UE is configured with a first set of CORESET/search space parameters, then the UE can determine the applicable K0_min based on the first K0_min.

In at least some embodiments, if the UE is configured with a second set of CORESET/search space parameters, such as monitoringSlotPeriodicityAndOffset, then the UE can determine the applicable K0_min based on the second K0_min.

In at least some embodiments, if the number of CORESETs to be monitored, such as CORESETs with monitored search space, in a slot and/or CORESET(s) duration is smaller than a threshold, then the UE can determine the applicable K0_min based on the first K0_min.

In at least some embodiments, if the number of CORESETs to be monitored in a slot and/or CORESET(s) duration is larger than the threshold, then the UE can determine the applicable K0_min based on the second K0_min.

In at least some embodiments, a multi-PDCCH, such as for multi-TRP, capable UE can have higher processing capability compared to a UE that is not capable of multi-TRP operation, and in that case a UE capability, such as irrespective to whether multi-TRP operation is enabled or not, can indicate a K0_min value for the purpose of power saving. The UE can indicate the second capability, such as for minimum value of the scheduling offset, if the processing capability of multi-TRP capable UE is not noticeably higher than the processing capability of non-multi-TRP capable UE. The processing capability can be the PDSCH processing capability used in TS 38.214, such as PDSCH processing capability 1 and 2 related to PDSCH decoding time N1 symbols, or the PDCCH processing capability for instance indicated by pdcch-BlindDetectionCA capability used in TS 38.213. In one embodiment, if a UE is not configured with multi-TRP operation, a first PDSCH/PDCCH processing capability is applicable, and if the UE is configured with multi-TRP operation, a second PDSCH/PDCCH processing capability is applicable, then only the first capability for minimum value of the scheduling offset can be used. If the first and the second PDSCH/PDCCH processing capabilities are the same, then the first and the second capabilities for minimum value of the scheduling offset can be used.

The UE can indicate a third capability for minimum value of a scheduling offset, such as a time gap between the end of the scheduling PDCCH and the beginning of the corresponding PDSCH, referred to as K0_min, to the network. The second capability can be associated with multi-TRP operation with 'M1' TRPs, or up to M1-TRPs, and the third capability can be associated with multi-TRP operation with 'M2' TRPs or from M1+1 up to M2 TRPs, where M1<M2, and number of TRPs can be configured. The maximum number of TRPs/TCI states a UE can simultaneously have PDSCH transmissions associated can be configured by higher layer signaling.

In an alternate embodiment, the UE can indicate only the first capability for minimum value of the scheduling offset, and in case multi-TRP operation is configured/enabled, an offset can be added to the indicated K0_min value. The offset can be fixed in the specification for different PDSCH processing capabilities, such as fraction of N1 or N2 values, or signaled as capability, such as a fraction of N1 or N2, or offset value for a reference subcarrier spacing. N2 can be a PUSCH preparation/processing time, as understood to one of ordinary skill in the art. In an embodiment, the offset to K0_min value can be applied when multi-DCI/multi-PDCCH is used, such as for multi-TRP operation, and if single PDCCH is used to schedule PDSCHs associated to multiple TRPs, the same K0_min value can be applicable.

In another embodiment, if PDSCHs associated with a first TRP are expected to be scheduled with a K0_min>0, such as via determination of K0_min based on the scheduling PDCCH or MAC-CE signaling, for example in the case of non-ideal backhaul, the UE can indicate to other TRPs that the first TRP has indicated K0_min>0 so that other TRPs can lead to power saving or the other way around if PDSCHs associated with the first TRP are expected to be scheduled with a K0_min=0, such as via determination of K0_min based on the scheduling PDCCH or MAC-CE signaling, such as in case of non-ideal backhaul, UE can indicate to other TRPs that the first TRP has indicated K0_min=0 so that other TRPs can benefit from same-slot scheduling with smaller scheduling latency than the latency due to cross-slot scheduling.

The following related embodiments can be dependent or independent embodiments with respect to each other. The UE can indicate via PUCCH if K0_min is larger than '0' at least for 'n' TRPs, such as identified by different CORESETs, where 'n' can be configurable/fixed in the specifications, such as one, can depend on the number of TRPs or CORESETs, and/or can depend on the value of K0_min.

In one embodiment, if a UE receives an indication that a PDSCH from a first TRP or a PDSCH associated with a first TCI state, or a PDSCH associated with/scheduled by a PDCCH detected in a first search space of a first CORESET, is scheduled with a K0_min>0, such as cross-slot scheduling based power saving mode is enabled for the first TRP/first TCI state/first search space/first CORESET, the UE can assume that a DL assignment DCI format/PDCCH detected in any of CORESETs, which can be monitored in a slot where the first CORESET, the first search space is monitored, carries PDSCH scheduling information with K0_min>0. The UE can be not expected to receive different K0_min indications applicable to a slot. Even in non-ideal backhaul, multiple TRPs can coordinate semi-statically, such as in every 10 msec, for scheduling and other configuration information. Thus, semi-static power saving mode operation, such as enabling/disabling of cross-slot scheduling based power saving mode for a given CORESET/search space is done semi-statically, can be coordinated among the cooperating TRPs.

In another embodiment, if a UE receives an indication that a PDSCH from a first TRP, or a PDSCH associated with a first TCI state, or a PDSCH associated with/scheduled by a PDCCH detected in a first search space of a first CORESET, and is scheduled with a K0_min>0, such as cross-slot scheduling based power saving mode is enabled for the first TRP/first TCI state/first search space/first CORESET, and if a PDSCH from a second TRP, or a PDSCH associated with a second TCI state, or a PDSCH associated with/scheduled by a PDCCH detected in a second search space of a second CORESET is configured to be always scheduled with K0_min=0, such as cross-slot scheduling is not allowed for the second TRP/second TCI state/second search space/second CORESET for the UE, then the UE can assume that in a slot where the UE monitors both the first CORESET/first search space and the second CORESET/second search space, cross-slot scheduling based power saving mode operation can be disabled for the first TRP/first TCI state/first search space/first CORESET. In one embodiment, the PDSCH from the second TRP, or associated with the second TCI state, or associated with/scheduled by a PDCCH detected in the second search space of the second CORE- SET, can carry URLLC traffic, which can be always scheduled with same-slot scheduling.

In an embodiment, if a UE receives a traffic type/priority/latency indication, such as via scheduling DCI, then the UE can assume the cross-slot scheduling, K0_min>0 indication is not applicable anymore until the UE receives another cross-slot scheduling, K0_min>0 indication.

In an embodiment, if a UE is configured with DL SPS operation with the periodicity of 'm' slots or if a DL SPS operation with the periodicity of 'ln' slots is activated, such as by a DCI, the UE can assumes the cross-slot scheduling with k0_min<m is not possible, and the UE can be not expected to receive cross-slot scheduling, K0_min>0, indication with k0_min<m. The value of 'm' can be smaller than a threshold. The threshold can be a UE capability/configured via higher layers/dynamically indicated or fixed. In an embodiment, if the UE is configured with an SPS operation with short periodicity, the UE can be not expected to be scheduled with DL SPS PDSCH in the same slot or in a slot that is less than the indicated K0_min value with respect to the slot in which the activation DCI is received.

In an embodiment, the UE can be indicated a first minimum value of the scheduling offset, such as K0_min value which can be signaled via PDCCH or MAC-CE and can be for power saving operation. The UE can determine the K0_min value applicable to a slot based on the first K0_min value and the PDCCH processing capability of the UE if the UE is configured with multi-TRP operation, and if the UE is monitoring multiple CORESETs, or search spaces in multiple CORESETs, where each CORESET can correspond to a TRP or a set of TRPs for multi-TRP operation.

In an embodiment, the K0_min value applicable to the slot can be determined by adding an offset, which can be positive, negative, or zero, to the first K0_min value. The offset can be fixed in the specification for different PDSCH processing capabilities, such as fraction of N1 or N2 values, or signaled as a capability, such as a fraction of N1 or N2, or offset value for a reference subcarrier spacing. For multiple PDCCH in different CORESETS, such as for multi-TRP operation when the UE can monitor multiple CORESETs or search spaces in multiple CORESETs, where each CORESET can correspond to a TRP, or a set of TRPs, for multi-TRP operation, the number of symbols between the earliest CORESET and the latest CORESET, such as in a slot, can be added to the offset. In an embodiment, the offset can be an integer value in the unit of slots, and in another example, the offset can be an integer value in the unit of symbols.

In an example, minimum K0 value can be determined for each slot based on an indication of cross-slot scheduling and the number of CORESETs associated with different TCI states being monitored in the slot.

In one embodiment, a multi-PDCCH, for multi-TRP, capable UE can have higher processing capability and can be able to support the same K0_min value for single-TRP operation and multi-TRP operation. The UE can indicate only a single minimum value of a scheduling offset, K0_min, which can be applicable to both single-TRP operation and multi-TRP operation.

In one embodiment, the UE can indicate a first capability for minimum value of a scheduling offset, first K0_min, associated with single-TRP operation. The multi-TRP operation associated K0_min, second K0_min, value can be determined based on an offset added to the first K0_min for single-PDCCH or single TRP operation. The offset can be in number of slots, or symbols, instead of slots, with value depending on the subcarrier spacing. The offset can be fixed in the specification for different PDSCH processing capabilities, such as a fraction or scaling factor of N1 or N2 values, or signaled as a second capability, such as a fraction or scaling factor of N1 or N2 or offset value for a reference subcarrier spacing, or can depend on the number of TRPs, or CORESETs, and can depend on the value of first K0_min. In one embodiment, if the UE is monitoring search space in multiple CORESETs in a slot, the number of symbols between the earliest CORESET and the latest CORESET can be added to the offset to determine the second K0_min value. The UE can determine the applicable K0_min based on one or more of the various embodiments described above for determining the applicable K0_min.

In some embodiments, the scheduling offset (K0_min) value can be for or correspond to a reference subcarrier spacing such as the subcarrier spacing for SIB1, or subcarrier spacing for the initial DL BWP or the lowest subcarrier spacing supported for that band. The K0_min value for other subcarrier spacing can be determined based on the indicated K0_min value and the reference subcarrier spacing, such as scaling factors fixed in the specification or indicated in capability signaling. In one example, K0_min values for each of the subcarrier spacings supported for the band can be indicated in the capability signaling.

In an embodiment, the cross-slot scheduling indication, such as indicating K0_min once received can be applicable to the next "T" slots, where "T" can be configured or UE capability or traffic dependent or DCI format dependent. In another embodiment, if cross-slot scheduling for power saving is configured/enabled, the UE can go into power saving mode, such as UE assumes a K0_min>0, unless it receives a DL scheduling DCI indicating a TDRA entry with K0=0. Upon such reception, a timer can be triggered and can run for "R" slots and, while the timer is running K0_min may not be assumed to be zero. Once the timer expires, the UE can go back to the power saving mode, such as by assuming K0_min>0.

In an embodiment, if the UE is configured with multi-TRP operation with multiple PDCCHs being monitored in different search spaces of different CORESETs associated to different TRPs/TCI states, and the different search spaces are monitored in different slots, if there is a timer for cross-slot scheduling, then the initial value of timer can allow giving different TRPs a chance to transmit, such as if there are 2 TRPs the initial timer value can be a multiple of 2 slots. In another embodiment, the on-duration or the initial value of the inactivity timer of Discontinuous Reception (DRX) for a UE in units of slot can be a multiple of number of TRPs configured. In one embodiment, if the first DL assignments associated with the first TRP is being monitored in odd slots and the second DL assignments associated with the second TRP is being monitored in even slots, then the timers for power saving or DRX timers and on-duration can be set such that their initial value ends in an odd slot, such as by assuming the first slot index is slot 0. In an embodiment, for a UE configured with two TRPs, the DRX on-duration in unit of slot can be a multiple of 2 slots, and the DRX inactivity timer may only expire in odd slots assuming the DRX on-duration has started in an even slot.

According to a possible embodiment, a UE can indicate to the network, a first and a second capability for a minimum value of a scheduling offset between a scheduling DCI and the corresponding PDSCH. The first capability can be associated with single-TRP operation and the second capability can be associated with multi-TRP operation.

According to another possible embodiment, a UE can receive a configuration configuring the UE to communicate with the network via a set of TRPs. The UE can receive one or more indications from a first subset of the set of TRPs indicating that the minimum value of a scheduling offset associated with each TRP of the set of TRPs transmission is greater than zero. The UE can indicate to at least a second subset of TRPs that the minimum value of a scheduling offset associated with a number of TRPs of the set of TRPs transmission is greater than zero.

According to another possible embodiment, a UE can receive a configuration configuring the UE to communicate with the network via a set of TRPs. The UE can receive one or more indications from a first subset of the set of TRPs indicating that the minimum value of a scheduling offset associated with each TRP of the set of TRPs transmission is zero. The UE can indicate to at least a second subset of TRPs that the minimum value of a scheduling offset associated with the transmissions of the first subset of TRPs can be zero if the minimum value of a scheduling offset associated with the transmission(s) of a number of TRPs of the set of TRPs is greater than zero.

According to another possible embodiment at a base station with a first TRP and a second TRP, the base station can send a minimum value of a scheduling offset from the first TRP to the second TRP. The base station can send an indication from at least the second TRP to the UE indicating the minimum value of the scheduling offset. The base station can transmit DL data, such as PDSCH, from both TRPs to the UE respecting the minimum value of the scheduling offset.

According to another possible embodiment, a UE can determine a minimum value of a scheduling offset between scheduling DCI and corresponding PDSCH based on an indication of a first minimum value of a scheduling offset and the number of, the location of, and the duration of the CORESETs associated with different TCI states being monitored in the slot.

According to another possible embodiment, a UE can receive a DL SPS configuration with a SPS periodicity of 'm' slots, where 'm' can be smaller than a threshold, such as 10 ms. The UE can receive an indication of a minimum value of a scheduling offset between scheduling DCI and corresponding PDSCH. The UE can discard the indication after reception of a SPS activation command in a slot.

According to another possible embodiment, a User Equipment (UE) can receive an indication of a first minimum value of a scheduling offset between scheduling DCI and corresponding PDSCH for PDSCHs scheduled via PDCCHs being monitored in a first search space of a first CORESET. The UE can assume PDSCH scheduling information in a second search space of a second CORESET has a minimum value of a scheduling offset determined based on the first minimum value of a scheduling offset. The minimum value of a scheduling offset can be the same as the first minimum value of a scheduling offset.

In some embodiments different UE capabilities for a minimum K0 value can be signaled based on the number of TRPs.

In some embodiments the UE can indicate to the other TRPs if the UE configuration for a TRP results in the UE going into/out-of-power saving mode.

In some embodiments the minimum K0 value can be coordinated amongst TRP semi-statically.

In some embodiments the minimum K0 value can be determined for each slot based on an indication of cross-slot scheduling and the number of CORESETs associated with different TCI states being monitored in the slot.

In some embodiments conditions where the indicated minimum K0 value is not applicable/disabled can include SPS with short periodicity activated/configured, reception of a URLLC scheduling DCI, and/or cross-slot scheduling is not being configured for one of the TRPs.

In some embodiments the minimum K0 value determination for PDSCHs of a set of TRPs can be based on the indicated minimum K0 value corresponding to PDSCHs of a different set of TRPs.

Figure 3:
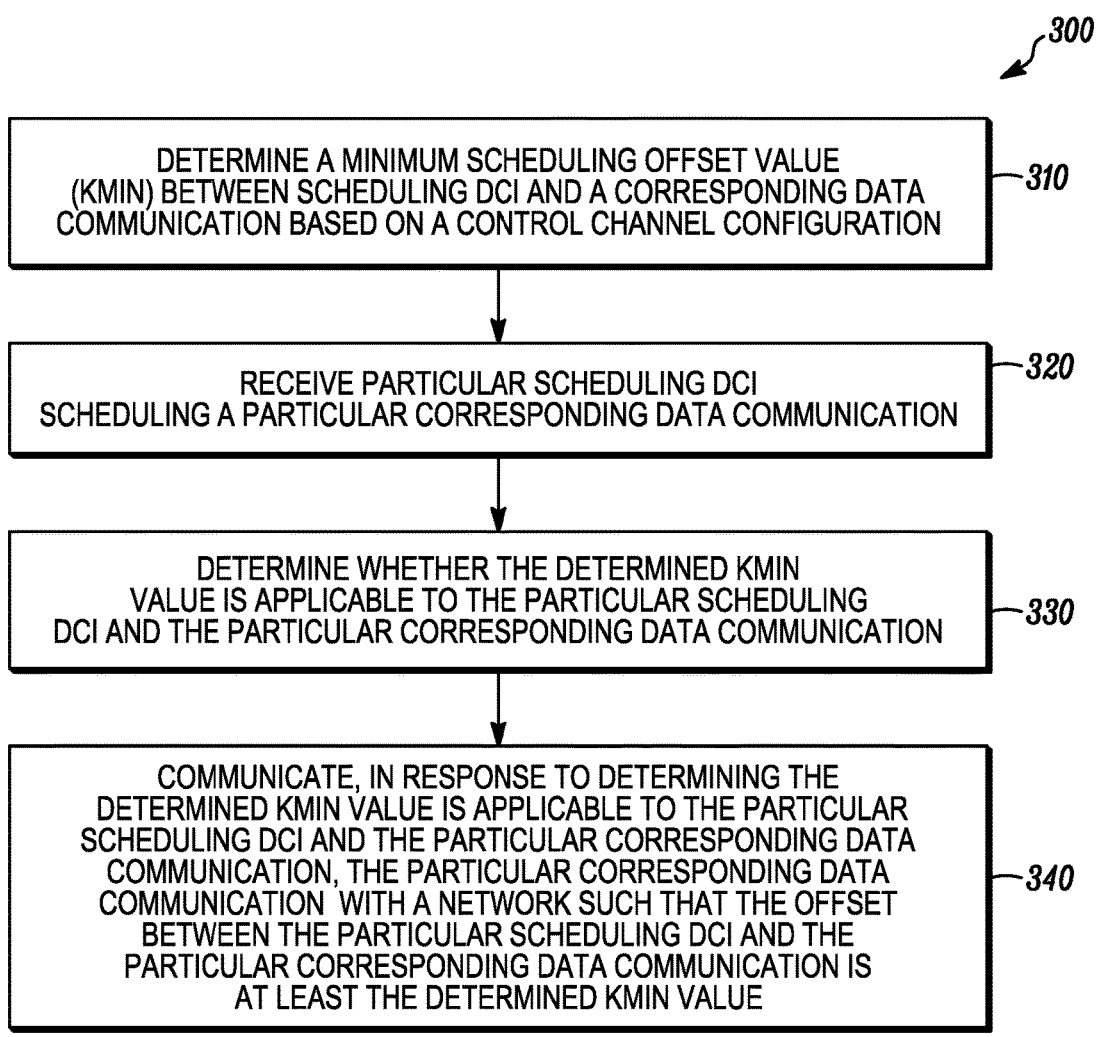
FIG. 3 is an example flowchart illustrating the operation of a wireless communication device according to a possible embodiment.

FIG. 3 is an example flowchart 300 illustrating the operation of a wireless communication device, such as the UE 110, according to a possible embodiment. At 310, a minimum scheduling offset value (Kmin) between scheduling DCI and a corresponding data communication can be determined based on a control channel configuration. At 320, particular scheduling DCI can be received. The particular scheduling DCI can schedule a particular corresponding data communication.

At 330, a determination can be made as to whether the determined Kmin value is applicable to the particular scheduling DCI and the particular corresponding data communication. At 340, in response to determining the determined Kmin value is applicable to the particular scheduling DCI and the particular corresponding data communication, the particular corresponding data communication can be communicated with a network such that the offset between the particular scheduling DCI and the particular corresponding data communication is at least the determined Kmin value. The offset can be a time offset.

According to a possible embodiment, the control channel configuration can be a maximum number of CORESETs in a PDCCH configuration, a limitation on number of PDCCH blind decodes, a limitation on number of CCEs for PDCCH monitoring, and/or any other control channel configuration. According to a possible embodiment, the determined Kmin value can be further determined based on a PDCCH processing capability, a PDSCH processing capability, a PUSCH processing capability, and/or any other information. For example, the offset can be fixed in the specification for different PDSCH processing capabilities, such as fixed as fraction of N1 or N2 values, or signaled as UE capability signaling, such as signaled as a fraction of N1 or N2 or offset value for a reference subcarrier spacing, and/or can be otherwise established. N1 can be defined in tables 5.3-1 and 5.3-2 in section 5.3 of TS 38.214. N2 can be defined in tables 6.4-1 and 6.4-2 in section 6.4 of TS 38.214. According to a possible embodiment, the determined Kmin value can further be determined based on an indication from the network.

According to a possible embodiment, an indication can be sent to the network indicating that the UE is capable of power saving using a first set of Kmin values associated with a first control channel parameter and using a second set of Kmin values associated with a second control channel parameter. The determined Kmin value can be determined based on the first set of Kmin values and the second set of Kmin values. According to a possible embodiment, a control channel parameter can be a maximum number of CORESETs in a PDCCH configuration, a limitation on number of PDCCH blind decodes, a limitation on number of CCEs for PDCCH monitoring, a PDCCH processing capability, a PDSCH processing capability, a PUSCH processing capability, and/or any other control channel parameter.

According to a possible embodiment, the particular scheduling DCI can indicate a scheduling offset (K) to apply between the particular scheduling DCI and the particular corresponding data communication. The determined Kmin value can be applicable to the particular scheduling DCI and the particular corresponding data communication if the scheduling offset (K) is equal to or larger than the determined Kmin value. A scheduling DCI can schedule data communication. According to a possible embodiment, the particular corresponding data communication may not be communicated with the network based on the scheduling offset (K) being less than the determined Kmin value.

According to a possible embodiment, a priority indication can be received in the particular scheduling DCI. The determined Kmin value can be determined to not be applicable to the particular scheduling DCI and the particular corresponding data communication. In response to determining the determined Kmin value is not applicable to the particular scheduling DCI and the particular corresponding data communication, the particular corresponding data communication can be communicated with the network such that the offset between the particular scheduling DCI and the particular corresponding data communication is smaller than the determined Kmin value.

According to a possible embodiment, the particular corresponding data communication can be a PDSCH data transmission. According to a possible embodiment, the particular corresponding data communication can be an PUSCH data transmission.

According to a possible embodiment, an indication can be sent to the network indicating that the UE is capable of power saving using a particular Kmin value. The Kmin value can be determined by applying an offset to the particular Kmin value. According to a possible embodiment, applying the offset to the particular Kmin value can include adding the offset to the particular Kmin value when the UE monitors at least a certain number of CORESETs for PDCCH monitoring. According to a possible embodiment, the offset can be determined based on a PDCCH processing capability, a PDSCH processing capability, a PUSCH processing capability, and/or other information.

Figure 4:
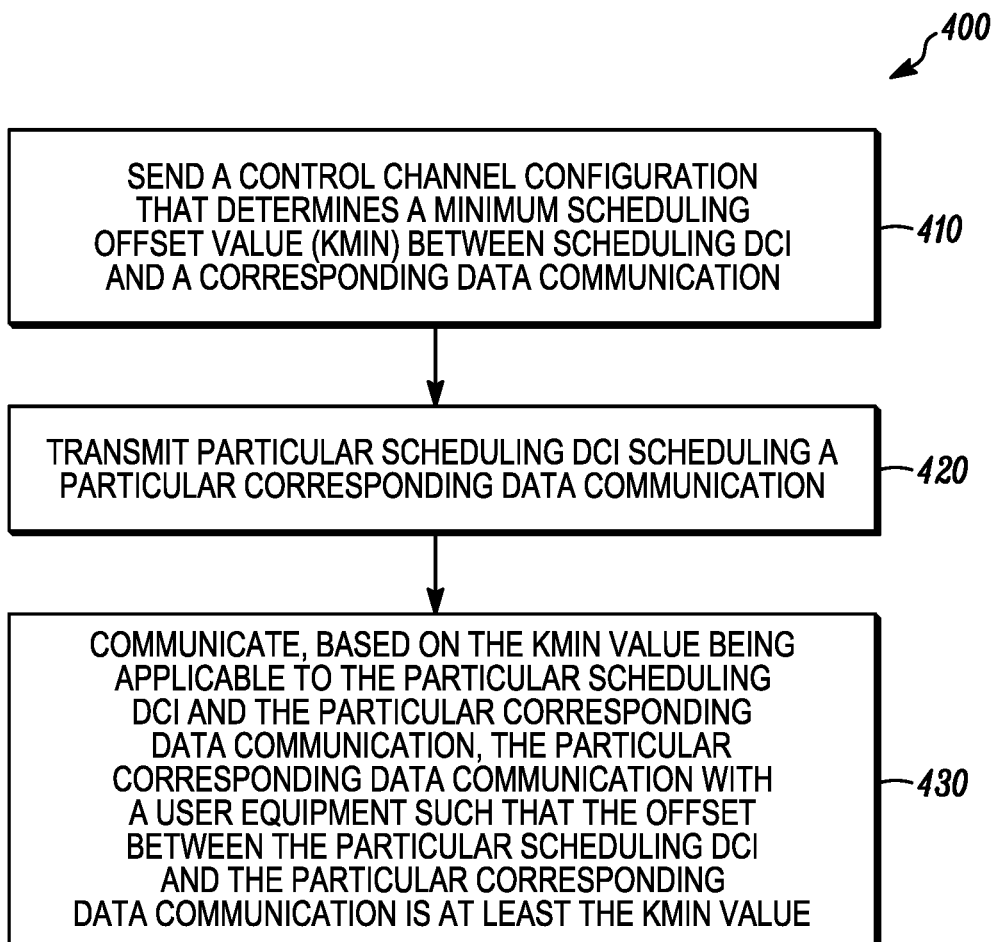
FIG. 4 is an example flowchart illustrating the operation of a wireless communication device according to a possible embodiment.

FIG. 4 is an example flowchart 400 illustrating the operation of a wireless communication device, such as the network entity 120, according to a possible embodiment. At 410, a control channel configuration can be sent. The control channel configuration can determine a minimum scheduling offset value (Kmin) between scheduling DCI and a corresponding data communication. At 420, particular scheduling DCI can be transmitted. The particular scheduling DCI can schedule a particular corresponding data communication. At 430, the corresponding data communication can be communicated, based on the Kmin value being applicable to the particular scheduling DCI and the particular corresponding data communication, with a user equipment such that the offset between the particular scheduling DCI and the particular corresponding data communication is at least the Kmin value. Other reciprocal operations to the flowchart 300 can also be performed.

Figure 5:
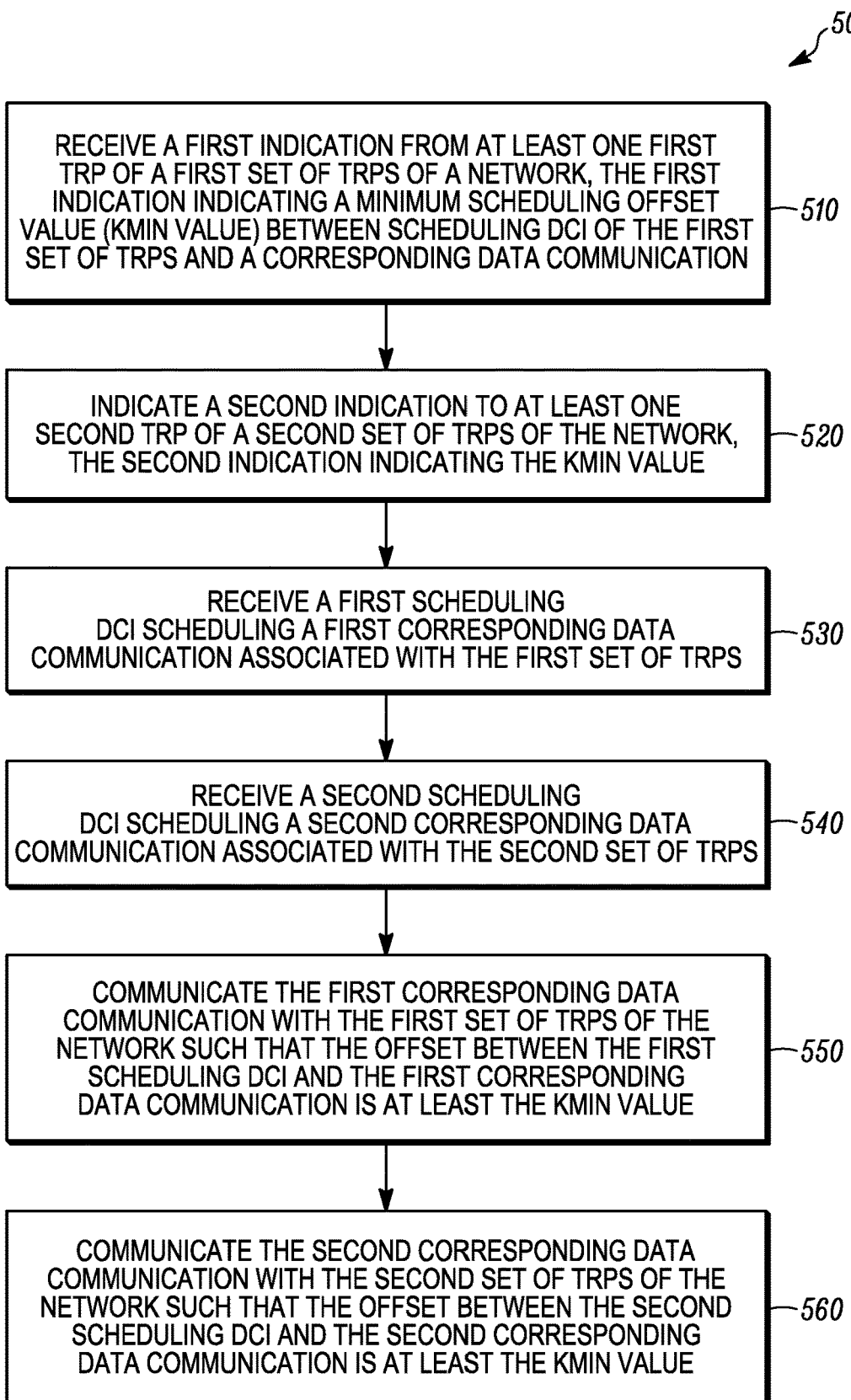
FIG. 5 is an example flowchart illustrating the operation of a wireless communication device according to a possible embodiment.

FIG. 5 is an example flowchart 500 illustrating the operation of a wireless communication device, such as the UE 110, according to a possible embodiment. At 510, a first indication can be received from at least one first TRP of a first set of TRPs of a network. The first indication can indicate a minimum scheduling offset value (Kmin value) between scheduling DCI of the first set of TRPs and a corresponding data communication. At 520, a second indication can be indicated to at least one second TRP of a second set of TRPs of the network. The second indication can indicate the Kmin value. At 530, a first scheduling DCI can be received. The first scheduling DCI can schedule a first corresponding data communication associated with the first set of TRPs. At 540, a second scheduling DCI can be received. The second scheduling DCI can schedule a second corresponding data communication associated with the second set of TRPs.

At 550, the first corresponding data communication can be communicated with the first set of TRPs of the network such that the offset between the first scheduling DCI and the first corresponding data communication is at least the Kmin value. At 560, the second corresponding data communication can be communicated with the second set of TRPs of the network such that the offset between the second scheduling DCI and the second corresponding data communication is at least the Kmin value.

According to a possible embodiment, the first scheduling DCI can be received in a first CORESET of a first set of CORESETs. The second scheduling DCI can be received in a second CORESET of a second set of CORESETs. The first set of CORESETs and the second set of CORESETs can be different. The first CORESET and the second CORESET can be different.

According to a possible embodiment, the first CORESET can be associated with a first TCI state, the second CORESET can be associated with a second TCI state, and the first TCI state and the second TCI state can be different.

According to a possible embodiment, the second indication can be indicated via a physical layer uplink control channel (PUCCH).

According to a possible embodiment, the first corresponding data communication can be a first PDSCH data transmission and the second corresponding data communication can be a second PDSCH data transmission.

According to a possible embodiment, the first corresponding data communication can be a first PUSCH data transmission and the second corresponding data communication can be a second PUSCH data transmission.

According to a possible embodiment, the Kmin value can be zero. According to a possible embodiment, the Kmin value can be greater than zero.

According to a possible embodiment, the first scheduling DCI scheduling can be received in a slot. The second scheduling DCI can be received in the same slot as the first scheduling DCI.

According to a possible embodiment, the first corresponding data communication can be communicated in a slot. The second corresponding data communication can be communicated in the same slot as the first corresponding data communication.

According to a possible embodiment, the first downlink PDSCH can be associated with a first TCI state. The second downlink PDSCH can be associated with a second TCI state. The first TCI state and the second TCI state can be different.

According to a possible embodiment, the first indication can be control information regarding a URLLC communication between the first set of TRPs and the UE. The Kmin value can be zero. For example, if the UE receives a PDSCH or PDCCH scheduling a PDSCH, that can be implicitly be considered the first indication, and the indicated Kmin value can be zero, such as when the UE receives information regarding scheduling of a URLLC communication, the UE can assume the Kmin value is indicated to be zero.

According to a possible embodiment, a backhaul between the first set of TRPs and the second set of TRPs can be determined to be non-ideal. The second indication can be indicated to the at least one second TRP of the second set of TRPs of the network in response to determining the backhaul between the first set of TRPs and the second set of TRPs is non-ideal.

Figure 6:
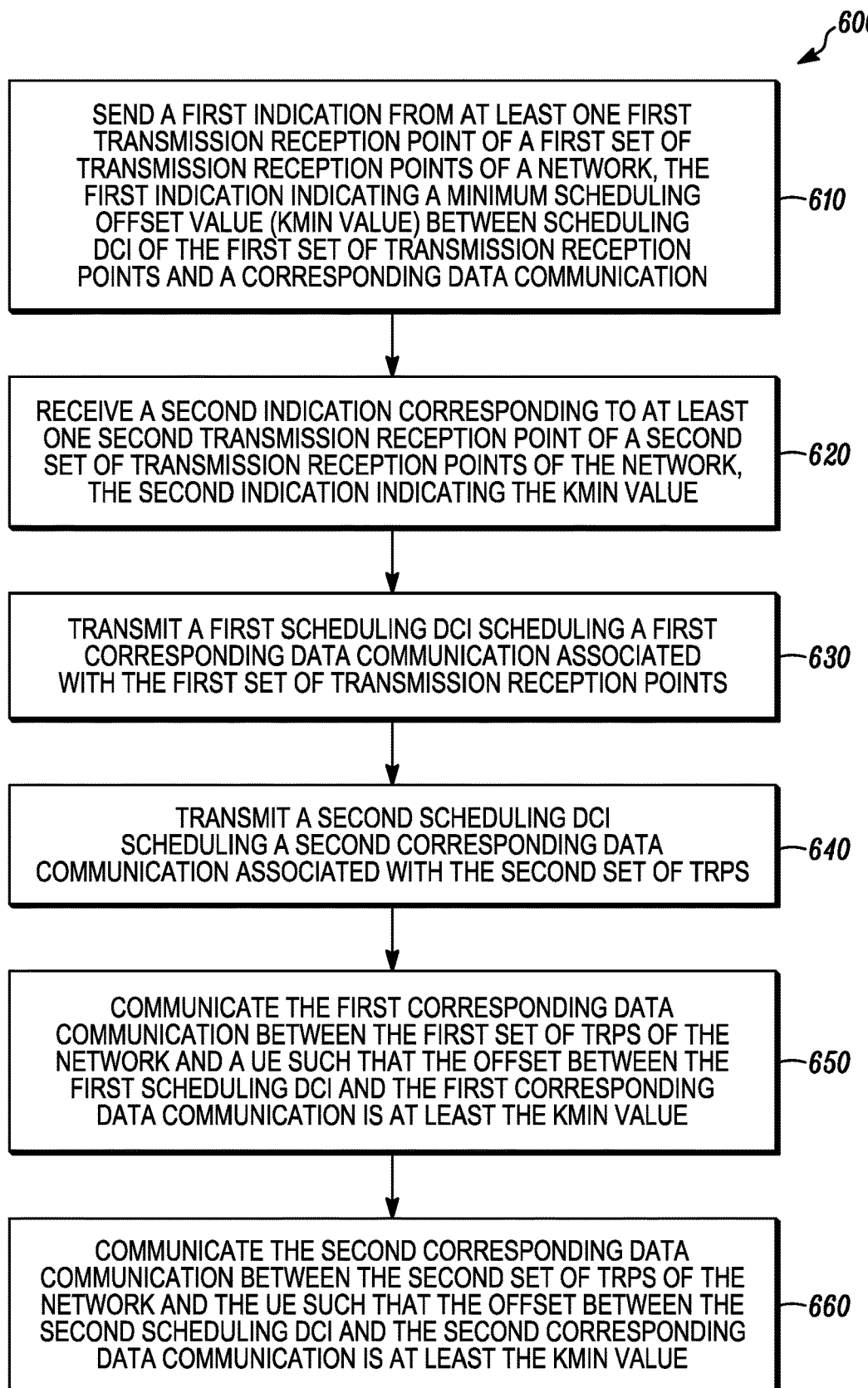
FIG. 6 is an example flowchart illustrating the operation of a wireless communication device according to a possible embodiment.

FIG. 6 is an example flowchart 600 illustrating the operation of a wireless communication device, such as the network entity 120, according to a possible embodiment. At 610, a first indication can be sent from at least one first transmission reception point of a first set of transmission reception points of a network. The first indication can indicate a minimum scheduling offset value (Kmin value) between scheduling DCI of the first set of transmission reception points and a corresponding data communication.

At 620, a second indication can be received. The second indication can correspond to at least one second transmission reception point of a second set of transmission reception points of the network. The second indication can indicate the Kmin value.

At 630, a first scheduling DCI can be transmitted. The first scheduling DCI can schedule a first corresponding data communication associated with the first set of transmission reception points.

At 640, a second scheduling DCI can be transmitted. The second scheduling DCI can schedule a second corresponding data communication associated with the second set of TRPs.

At 650, the first corresponding data communication can be communicated between the first set of TRPs of the network and a UE such that the offset between the first scheduling DCI and the first corresponding data communication is at least the Kmin value.

At 660, the second corresponding data communication can be communicated between the second set of TRPs of the network and the UE such that the offset between the second scheduling DCI and the second corresponding data communication is at least the Kmin value.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

According to a possible embodiment, a method can be performed at a UE. The method can include reporting to a network, a set of minimum scheduling offset values for cross-slot scheduling for power saving associated with a value for a maximum number of TRPs.

According to a possible implementation, the set of minimum scheduling offset values can include a first set of minimum scheduling offset values associated with a first value for the maximum number of TRPs. The set of minimum scheduling offset values can include a second set of minimum scheduling offset values associated with a second value for the maximum number of TRPs. The first set of minimum scheduling offset values and the second set of minimum scheduling offset values can be different.

According to a possible implementation, the first value for the maximum number of TRPs can be one and the second value for the maximum number of TRPs can be two.

According to a possible implementation, maximum number of TRPs can be determined based on a maximum number of CORESETs for PDCCH monitoring and/or based on a maximum number of simultaneous PDSCH receptions with different TCI states.

According to a possible implementation, the maximum number of TRPs can be determined based on a maximum number of CORESETs with different TCI states.

Figure 7:
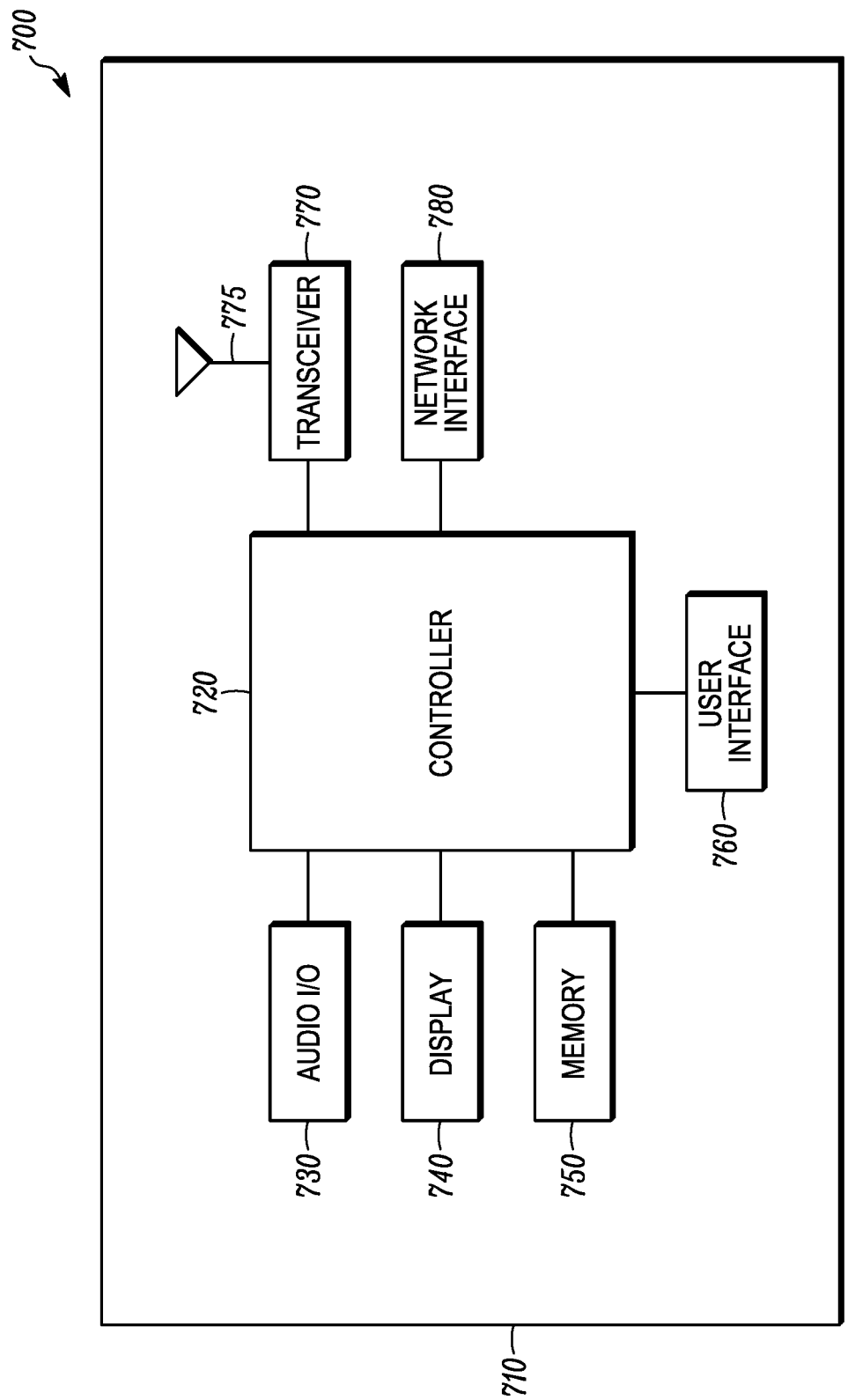
FIG. 7 is an example block diagram of an apparatus according to a possible embodiment.

FIG. 7 is an example block diagram of an apparatus 700, such as the UE 110, the network entity 120, or any other wireless communication device disclosed herein, according to a possible embodiment. The apparatus 700 can include a housing 710, a controller 720 coupled to the housing 710, audio input and output circuitry 730 coupled to the controller 720, a display 740 coupled to the controller 720, a memory 750 coupled to the controller 720, a user interface 760 coupled to the controller 720, a transceiver 770 coupled to the controller 720, at least one antenna 775 coupled to the transceiver 770, and a network interface 780 coupled to the controller 720. The apparatus 700 may not necessarily include all of the illustrated elements for different embodiments of the present disclosure. The apparatus 700 can perform the methods described in all the embodiments.

The display 740 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 770 can be one or more transceivers that can include a transmitter and/or a receiver. The audio input and output circuitry 730 can include a microphone, a speaker, a transducer, or any other audio input and output circuitry. The user interface 760 can include a keypad, a keyboard, buttons, a touch pad, a joystick, a touch screen display, another additional display, or any other device useful for providing an interface between a user and an electronic device. The network interface 780 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 750 can include a Random-Access Memory (RAM), a Read Only Memory (ROM), an optical memory, a solid-state memory, a flash memory, a removable memory, a hard drive, a cache, or any other memory that can be coupled to an apparatus.

The apparatus 700 or the controller 720 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 750, elsewhere on the apparatus 700, in cloud storage, and/or anywhere else that can store software and/or an operating system. The apparatus 700 or the controller 720 may also use hardware to implement disclosed operations. For example, the controller 720 may be any programmable processor. Furthermore, the controller 720 may perform some or all of the disclosed operations. For example, at least some operations can be performed using cloud computing and the controller 720 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 720 may be any controller or processor device or devices capable of operating an apparatus and implementing the disclosed embodiments. Some or all of the additional elements of the apparatus 700 can also perform some or all of the operations of the disclosed embodiments.

In operation, the apparatus 700 can perform the methods and operations of the disclosed embodiments. The transceiver 770 can transmit and receive signals, including data signals and control signals that can include respective data and control information. The controller 720 can generate and process the transmitted and received signals and information.

In operation according to a possible embodiment, the controller 720 can determine a minimum scheduling offset value (Kmin) between scheduling DCI and a corresponding data communication based on a control channel configuration. The transceiver 770 can receive particular scheduling DCI scheduling a particular corresponding data communication.

The controller 720 can determine whether the determined Kmin value is applicable to the particular scheduling DCI and the particular corresponding data communication. The transceiver 770 can communicate, in response to determining the determined Kmin value is applicable to the particular scheduling DCI and the particular corresponding data communication, the corresponding data communication with a network such that the offset between the particular scheduling DCI and the particular corresponding data communication is at least the determined Kmin value.

According to a possible embodiment, the control channel configuration can be a maximum number of CORESETs in a PDCCH configuration, a limitation on number of PDCCH blind decodes, a limitation on number of CCEs for PDCCH monitoring, and/or any other control channel configuration.

According to a possible embodiment, the determined Kmin value can be further determined based on an indication from the network.

According to a possible embodiment, the transceiver 770 can indicate to the network that the apparatus 700 is capable of power saving using a first set of Kmin values associated with a first control channel parameter and using a second set of Kmin values associated with a second control channel parameter. The determined Kmin value can be determined based on the first set of Kmin values and the second set of Kmin values.

According to a possible embodiment, the particular scheduling DCI can indicate a scheduling offset (K) to apply between the particular scheduling DCI and the particular corresponding data communication. The determined Kmin value can be applicable to the particular scheduling DCI and the particular corresponding data communication if the scheduling offset (K) is equal to or larger than the determined Kmin value.

According to a possible embodiment, the transceiver 770 can receive a priority indication in the particular scheduling DCI. The controller 720 can determine the determined Kmin value is not applicable to the particular scheduling DCI and the particular corresponding data communication. In response to determining the determined Kmin value is not applicable to the particular scheduling DCI and the particular corresponding data communication, the transceiver 770 can communicate the particular corresponding data communication with the network such that the offset between the particular scheduling DCI and the particular corresponding data communication is smaller than the determined Kmin value.

In operation according to a possible embodiment, the transceiver 770 can receive a first indication from at least one first TRP of a first set of TRPs of a network. The first indication can indicate a minimum scheduling offset value (Kmin value) between scheduling DCI of the first set of TRPs and a corresponding data communication. The transceiver 770 can indicate a second indication to at least one second TRP of a second set of TRPs of the network. The second indication can indicate the Kmin value. The transceiver 770 can receive a first scheduling DCI scheduling a first corresponding data communication associated with the first set of TRPs. The transceiver 770 can receive a second scheduling DCI scheduling a second corresponding data communication associated with the second set of TRPs.

The transceiver 770 can communicate the first corresponding data communication with the first set of TRPs of the network such that the offset between the first scheduling DCI and the first corresponding data communication is at least the Kmin value. The transceiver 770 can communicate the second corresponding data communication with the second set of TRPs of the network such that the offset between the second scheduling DCI and the second corresponding data communication is at least the Kmin value.

According to a possible embodiment, the first scheduling DCI can be received in a first CORESET of a first set of CORESETs. The second scheduling DCI can be received in a second CORESET of a second set of CORESETs. The first set of CORESETs and the second set of CORESETs can be different.

According to a possible embodiment, the second indication can be indicated via a physical layer uplink control channel (PUCCH).

According to a possible embodiment, the first corresponding data communication can be a first PDSCH data transmission. The second corresponding data communication can be a second PDSCH data transmission.

According to a possible embodiment, the first corresponding data communication can be a first PUSCH data transmission. The second corresponding data communication can be a second PUSCH data transmission.

According to a possible embodiment, the first scheduling DCI scheduling can be received in a slot. The second scheduling DCI can be received in the same slot as the first scheduling DCI.

According to a possible embodiment, the first corresponding data communication can be communicated in a slot. The second corresponding data communication can be communicated in the same slot as the first corresponding data communication.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of" or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is not admitted as prior art, is written as the inventor's own understanding of the context of some embodiments at the time of filing, and includes the inventor's own recognition of any problems with existing technologies and/or problems experienced in the inventor's own work.

We claim:

1. An apparatus comprising:
a controller configured to determine a minimum scheduling offset value (Kmin value) between scheduling downlink control information and a corresponding data communication based on an indication from a network and at least one selected from
a physical downlink shared channel processing capability,
a physical downlink control channel processing capability, and
a physical uplink shared channel processing capability; and
a transceiver coupled to the controller, the transceiver configured to receive particular scheduling downlink control information scheduling a particular corresponding data communication,
wherein the controller determines whether the determined Kmin value is applicable to the particular scheduling downlink control information and the particular corresponding data communication, and
wherein the transceiver communicates, in response to determining the determined Kmin value is applicable to the particular scheduling downlink control information and the particular corresponding data communication, the particular corresponding data communication with the network such that the offset between the particular scheduling downlink control information and the particular corresponding data communication is at least the determined Kmin value.

2. The apparatus according to claim 1,
wherein the transceiver indicates, to the network, that the apparatus is capable of power saving
using a first set of Kmin values associated with a first control channel parameter, and
using a second set of Kmin values associated a second control channel parameter, and
wherein the determined Kmin value is determined based on the first set of Kmin values and the second set of Kmin values.

3. The apparatus according to claim 2, wherein a control channel parameter comprises at least one selected from
a maximum number of control resource sets in a physical downlink control channel configuration,
a limitation on number of physical downlink control channel blind decodes, and
a limitation on number of control channel elements for physical downlink control channel monitoring.

4. The apparatus according to claim 1,
wherein the particular scheduling downlink control information indicates a scheduling offset (K) to apply between the particular scheduling downlink control information and the particular corresponding data communication, and
wherein the determined Kmin value is applicable to the particular scheduling downlink control information and the particular corresponding data communication if the scheduling offset (K) is equal to or larger than the determined Kmin value.

5. The apparatus according to claim 4, wherein the transceiver does not communicate the particular corresponding data communication with the network based on the scheduling offset (K) being less than the determined Kmin value.

6. The apparatus according to claim 1,
wherein the transceiver receives a priority indication in the particular scheduling downlink control information, and
wherein the controller determines the determined Kmin value is not applicable to the particular scheduling downlink control information and the particular corresponding data communication,
wherein the transceiver communicates, in response to the controller determining the determined Kmin value is not applicable to the particular scheduling downlink control information and the particular corresponding data communication, the particular corresponding data communication with the network such that the offset between the particular scheduling downlink control information and the particular corresponding data communication is smaller than the determined Kmin value.

7. The apparatus according to claim 1, further comprising:
wherein the controller determines the determined Kmin value is not applicable to the particular scheduling downlink control information and the particular corresponding data communication based on at least one of a corresponding downlink control information format or traffic type, and
wherein the transceiver communicates, in response to the controller determining the determined Kmin value is not applicable to the particular scheduling downlink control information and the particular corresponding data communication, the particular corresponding data communication with the network such that the offset between the particular scheduling downlink control information and the particular corresponding data communication is smaller than the determined Kmin value.

8. The apparatus according to claim 1, wherein the particular corresponding data communication is a physical downlink shared channel data transmission.

9. The apparatus according to claim 1, wherein the particular corresponding data communication is a physical uplink shared channel data transmission.

10. The apparatus according to claim 1,
wherein the transceiver indicates, to the network, that the apparatus is capable of power saving using a particular Kmin value, and
wherein the controller determines the Kmin value by applying an offset to the particular Kmin value.

11. The apparatus according to claim 10, wherein the controller applies the offset to the particular Kmin value by adding the offset to the particular Kmin value when the controller monitors at least a certain number of control resource sets for physical downlink control channel monitoring.

12. The apparatus according to claim 10, wherein the controller determines the offset based on at least one selected from a physical downlink control channel processing capability, a physical downlink shared channel processing capability, and a physical uplink shared channel processing capability.

13. A method at a user equipment, the method comprising:
determining a minimum scheduling offset value (Kmin value) between scheduling downlink control information and a corresponding data communication based on an indication from a network and at least one selected from
a physical downlink shared channel processing capability,
a physical downlink control channel processing capability, and
a physical uplink shared channel processing capability;
receiving particular scheduling downlink control information scheduling a particular corresponding data communication;
determining whether the determined Kmin value is applicable to the particular scheduling downlink control information and the particular corresponding data communication; and
communicating, in response to determining the determined Kmin value is applicable to the particular scheduling downlink control information and the particular corresponding data communication, the particular corresponding data communication with the network such that the offset between the particular scheduling downlink control information and the particular corresponding data communication is at least the determined Kmin value.

14. The method according to claim 13, further comprising indicating, to the network, that the user equipment is capable of power saving
using a first set of Kmin values associated with a first control channel parameter, and
using a second set of Kmin values associated a second control channel parameter,
wherein the determined Kmin value is determined based on the first set of Kmin values and the second set of Kmin values.

15. The method according to claim 14, wherein a control channel parameter comprises at least one selected from
a maximum number of control resource sets in a physical downlink control channel configuration,
a limitation on number of physical downlink control channel blind decodes, and
a limitation on number of control channel elements for physical downlink control channel monitoring.

16. The method according to claim 13,
wherein the particular scheduling downlink control information indicates a scheduling offset (K) to apply between the particular scheduling downlink control information and the particular corresponding data communication, and
wherein the determined Kmin value is applicable to the particular scheduling downlink control information and the particular corresponding data communication if the scheduling offset (K) is equal to or larger than the determined Kmin value.

17. The method according to claim 16, further comprising not communicating the particular corresponding data communication with the network based on the scheduling offset (K) being less than the determined Kmin value.

18. The method according to claim 13, further comprising:
receiving a priority indication in the particular scheduling downlink control information; and
determining the determined Kmin value is not applicable to the particular scheduling downlink control information and the particular corresponding data communication,
wherein communicating comprises communicating, in response to determining the determined Kmin value is not applicable to the particular scheduling downlink control information and the particular corresponding data communication, the particular corresponding data communication with the network such that the offset between the particular scheduling downlink control information and the particular corresponding data communication is smaller than the determined Kmin value.

19. The method according to claim 13, further comprising determining the determined Kmin value is not applicable to the particular scheduling downlink control information and the particular corresponding data communication based on at least one of a corresponding downlink control information format or traffic type,
wherein communicating comprises communicating, in response to determining the determined Kmin value is not applicable to the particular scheduling downlink control information and the particular corresponding data communication, the particular corresponding data communication with the network such that the offset between the particular scheduling downlink control information and the particular corresponding data communication is smaller than the determined Kmin value.

20. An apparatus comprising:
a controller configured to control operations of the apparatus; and
a transceiver coupled to the controller, the transceiver configured to
transmit an indication,
transmit particular scheduling downlink control information scheduling a particular corresponding data communication, and
receive a communication of the particular corresponding data communication such that an offset between the particular scheduling downlink control information and the particular corresponding data communication is at least a determined minimum scheduling offset value (Kmin value) value, where the communication is communicated based on a determination that the determined Kmin value is applicable to the particular scheduling downlink control information and the particular corresponding data communication, wherein the determined Kmin value is a value of an offset between scheduling downlink control information and a corresponding data communication and is determined based on the transmitted indication and at least one selected from
- a physical downlink shared channel processing capability,
- a physical downlink control channel processing capability, and
- a physical uplink shared channel processing capability.

* * * * *